US012808421B2

(12) United States Patent
Yasui

(10) Patent No.: US 12,808,421 B2
(45) Date of Patent: Nov. 24, 2026

(54) VALVE AND SHOCK ABSORBER

(71) Applicant: KYB Corporation, Tokyo (JP)

(72) Inventor: Takeshi Yasui, Tokyo (JP)

(73) Assignee: KYB CORPORATION, Tokyo (JP)

( * ) Notice: Subject to any disclaimer, the term of this patent is extended or adjusted under 35 U.S.C. 154(b) by 464 days.

(21) Appl. No.: 18/285,341

(22) PCT Filed: Apr. 27, 2022

(86) PCT No.: PCT/JP2022/019079
§ 371 (c)(1),
(2) Date: Oct. 2, 2023

(87) PCT Pub. No.: WO2023/002735
PCT Pub. Date: Jan. 26, 2023

(65) Prior Publication Data
US 2024/0183423 A1 Jun. 6, 2024

(30) Foreign Application Priority Data
Jul. 20, 2021 (JP) ................................ 2021-119293

(51) Int. Cl.
*F16F 9/34* (2006.01)
*F16F 9/19* (2006.01)
(Continued)

(52) U.S. Cl.
CPC ................ *F16F 9/348* (2013.01); *F16F 9/19* (2013.01); *F16K 1/42* (2013.01); *F16F 2222/12* (2013.01)

(58) Field of Classification Search
CPC ........ F16F 9/348; F16F 9/3481; F16F 9/3482; F16F 9/3484; F16F 9/3485; F16F 9/3487; F16F 9/508
See application file for complete search history.

(56) References Cited

U.S. PATENT DOCUMENTS 4,964,493 A * 10/1990 Yamaura .............. F16F 9/3484 188/280
2004/0211633 A1* 10/2004 Kajino ................. F16F 9/3484 188/322.15
(Continued)

FOREIGN PATENT DOCUMENTS

CN 111936764 A 11/2020
JP 02097741 A * 4/1990
(Continued)

OTHER PUBLICATIONS

Machine translation of JP 2018-053978 (no date).*
(Continued)

*Primary Examiner* — Nicholas J Lane
(74) *Attorney, Agent, or Firm* — Paratus Law Group, PLLC

(57) ABSTRACT

There is provided a valve and a shock absorber that are inexpensive and excellent in assemblability. A valve of the present embodiment includes: an annular valve body; a spacer that is stacked on the annular valve body and serves as a fulcrum of the bending of a free end of the annular valve body; and a valve stopper that faces the annular valve body in an axial direction on the spacer side of the annular valve body and regulates the bending of the annular valve body when the annular valve body bends and comes into contact therewith, wherein the valve stopper includes: a ring that has a thickness in the axial direction smaller than the thickness of the spacer, and is arranged on an inner circumference or an outer circumference of the spacer; and a stacked annular plate that is stacked on the spacer.

14 Claims, 9 Drawing Sheets

(51) Int. Cl.
*F16F 9/348* (2006.01)
*F16K 1/42* (2006.01)

(56) References Cited

U.S. PATENT DOCUMENTS

| | | | | |
|---|---|---|---|---|
| 2018/0128341 | A1* | 5/2018 | Mizuno | F16F 9/19 |
| 2021/0010557 | A1* | 1/2021 | Kimishima | F16K 1/2263 |

FOREIGN PATENT DOCUMENTS

| | | | | |
|---|---|---|---|---|
| JP | H08-177932 | A | | 7/1996 |
| JP | H10-047412 | A | | 2/1998 |
| JP | 2004-239286 | A | | 8/2004 |
| JP | 2008-202745 | A | | 9/2008 |
| JP | 2009-299768 | A | | 12/2009 |
| JP | 2015-137677 | A | | 7/2015 |
| JP | 2018053978 | A | * | 4/2018 |
| JP | 2018-076920 | A | | 5/2018 |
| JP | 2019-183918 | A | | 10/2019 |
| WO | WO 2018/054601 | A1 | | 3/2018 |

OTHER PUBLICATIONS

English abstract for JP 02-097741 (1990).*
May 28, 2026, Chinese Office Action issued for related CN Application No. 202280027536.5.

* cited by examiner

VALVE AND SHOCK ABSORBER

CROSS REFERENCE TO PRIOR APPLICATION

This application is a National Stage Patent Application of PCT International Patent Application No. PCT/JP2022/019079 (filed on Apr. 27, 2022) under 35 U.S.C. § 371, which claims priority to Japanese Patent Application No. 2021-119293 (filed on Jul. 20, 2021), which are all hereby incorporated by reference in their entirety.

TECHNICAL FIELD

The present invention relates to a valve and a shock absorber.

BACKGROUND ART

Conventionally, a valve is used, for example, to generate a damping force by offering resistance to a flow of liquid produced during extension and contraction of a shock absorber. In addition, as disclosed in JP 2019-183918 A, for example, such a valve includes an annular valve body having a fixed end in which one of an inner circumference and an outer circumference is fixed to a valve case and a free end in which the other is movable to both sides in an axial direction, and an annular facing portion facing the outer circumference or the inner circumference of the free end of the valve body to form a gap that allows the liquid to pass therethrough.

According to the valve configured as described above, in a speed region where the extension/contraction speed (piston speed) of the shock absorber is low and the valve body does not bend, the gap formed between the outer circumference or the inner circumference of the free end of the valve body and the annular facing portion is maintained in a narrow state. On the other hand, when the piston speed of the shock absorber increases and the end portion on the free end side of the valve body bends, the gap formed between the outer circumference and the inner circumference of the free end of the valve body and the annular facing portion becomes wide.

Therefore, the shock absorber using the valve described above to generate the damping force can increase the damping coefficient in a very low-speed range where the extension/contraction speed is lower than the low speed to quickly rise the damping force in proportional to the extension/contraction speed, and make the damping coefficient smaller than that in the very low-speed range in the low-speed range, thus making it possible to achieve the damping force characteristic suitable for improving the ride quality of a vehicle.

CITATION LIST

Patent Literature

Patent Literature 1: JP 2019-183918 A

SUMMARY OF INVENTION

Technical Problem

In the conventional valve, a valve stopper is provided on both sides of the valve body in the axial direction to support the valve body when the valve body bends and regulate excessive bending of the valve body, thereby preventing a large stress from acting on the valve body.

The valve stopper is stacked on the valve body via a small-diameter spacer having an extremely small thickness, and includes two stopper members having different outer diameters. The outer diameter of the valve-body-side stopper member, which is arranged on the valve body side, of the stopper members is smaller than the outer diameter of the non-valve-body-side stopper member, which is arranged on the opposite side of the valve body. Therefore, when the valve body bends, the valve body comes into contact with the outer edge of the spacer, the outer edge of the valve-body-side stopper member, and the outer edge of the non-valve-body-side stopper member, and is supported in a posture such that the cross section of the valve body takes a gentle arc shape, thus regulating further bending of the valve body.

On the other hand, in the valve disclosed in JP H02-76937 A, as illustrated in FIG. 9, the inner circumference of an annular valve body 801 is fixed by a thick spacer 800, and the outer diameter of a valve stopper 802 that regulates the bending of the annular valve body 801 is also constant. According to the valve disclosed in JP H02-76937 A, when the annular valve body 801 bends under pressure, a radial intermediate portion of the annular valve body 801 is not supported at all. Therefore, the annular valve body 801 deforms in an undulating manner under pressure and is rapidly curved at a portion not supported by the spacer 800, and the outer circumference starting from the intermediate portion comes into contact with the valve stopper 802, resulting in excessive stress being applied. As described above, in the conventional valve, since the valve body is supported by the spacer and the stopper portion having different diameters, the undulating deformation of the cross section of the valve body is prevented, thus making it possible to reduce the stress acting on the valve body and improve the durability of the valve body.

In the conventional valve, although, as described above, an extremely thin spacer is required in order to prevent the annular valve body from being undulated and deformed, since the spacer sticks to each other during valve assembly when the spacer is taken out from a box accommodating the spacer, making it difficult to take out the spacer as many as necessary for the valve, assembling the conventional valve imposes a large burden on an operator.

In addition, since the extremely thin spacer is a dedicated part and cannot be used for other valves, which reduces the distribution amount and makes the spacer expensive, the manufacturing cost of the valve increases.

Therefore, an object of the present invention is to provide a valve and a shock absorber that are inexpensive and excellent in assemblability.

Solution to Problem

In order to solve the above problems, a valve according to the present invention includes: an annular valve body that has elasticity and is allowed to bend on an outer circumference serving as a free end; a spacer that is annular, has an outer diameter smaller than an outer diameter of the annular valve body, is stacked on the annular valve body, and serves as a fulcrum of the bending of the free end of the annular valve body; and a valve stopper that faces the annular valve body in an axial direction on a spacer side of the annular valve body and regulates the bending of the annular valve body when the annular valve body bends and comes into contact therewith, wherein the valve stopper includes: a ring that is annular, has a thickness in the axial direction smaller than the thickness of the spacer, and is arranged on the outer circumference of the spacer; and a stacked annular plate that is annular, has an outer diameter larger than the outer diameter of the ring, and is stacked on the spacer.

Alternatively, in order to solve the above problems, another valve according to the present invention includes: an annular valve body that has elasticity and is allowed to bend on an inner circumference serving as a free end; a spacer that is annular, has an inner diameter larger than an inner diameter of the annular valve body, is stacked on the annular valve body, and serves as a fulcrum of the bending of the free end of the annular valve body; and a valve stopper that faces the annular valve body in the axial direction on the spacer side of the annular valve body and regulates the bending of the annular valve body when the annular valve body bends and comes into contact therewith, wherein the valve stopper includes: a ring that is annular, has a thickness in the axial direction smaller than the thickness of the spacer, and is arranged on the inner circumference of the spacer; and a stacked annular plate that is annular, has an inner diameter smaller than the inner diameter of the ring, and is stacked on the spacer.

According to the valve configured as described above, since the valve stopper supports a vicinity of the spacer having a small deflection amount of the annular valve body that arcuately bends at the outer edge of the spacer serving as a fulcrum, at the ring having a thickness smaller than the thickness of the spacer, and supports the outer circumferential side of the annular valve body having a large deflection amount at a stacked annular plate whose outer diameter gradually increases stepwise toward the non-spacer side, it is not necessary to use a special extremely thin spacer to prevent the annular valve body from being undulated and deformed.

DESCRIPTION OF EMBODIMENTS

Figure 1:
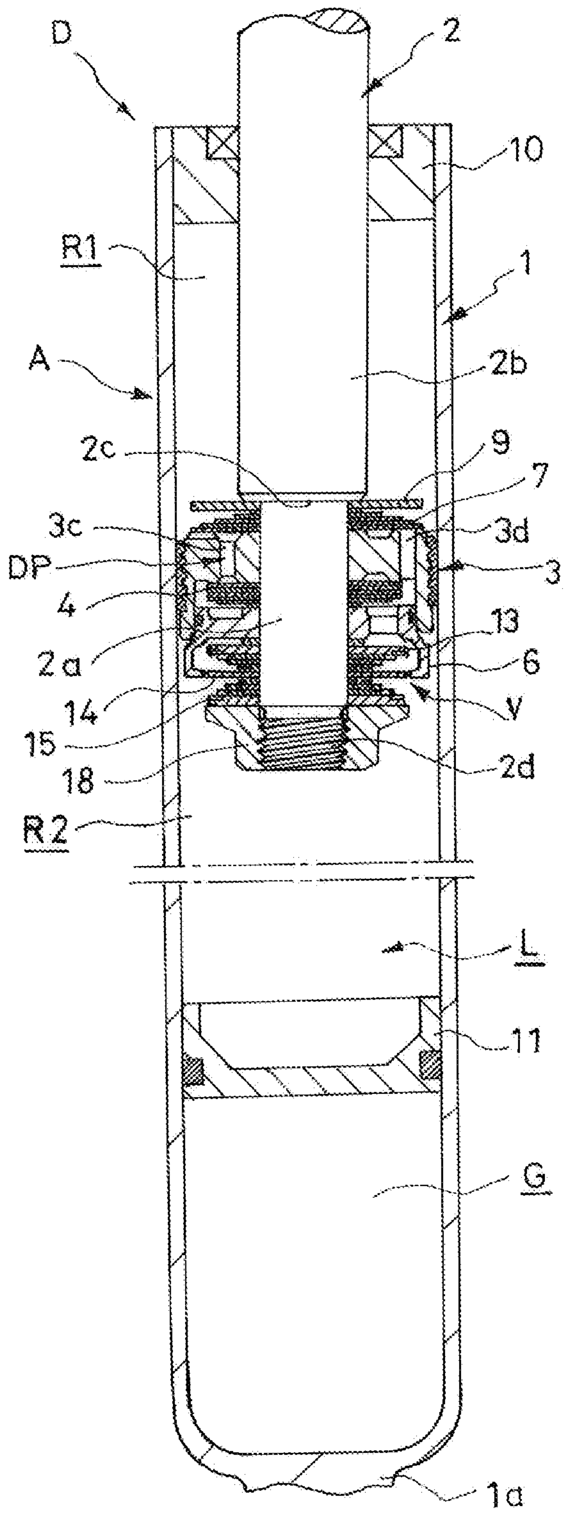
FIG. 1 is a longitudinal sectional view of a shock absorber including a valve according to one embodiment of the present invention.
Figure 2:
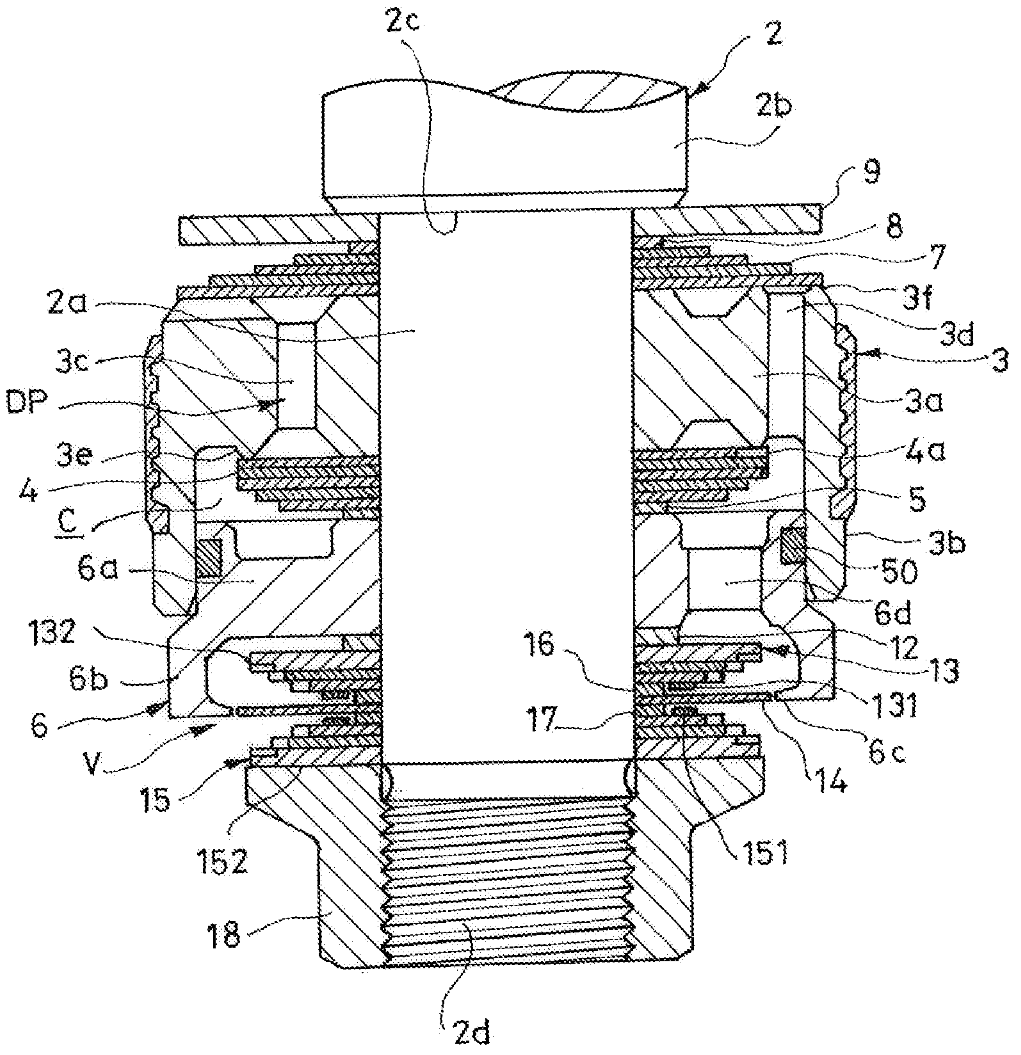
FIG. 2 is a cross-sectional view of the valve according to the one embodiment of the present invention.

Hereinafter, the present invention will be described based on the embodiments illustrated in the drawings. As illustrated in FIGS. 1 and 2, a shock absorber D according to a first embodiment includes: a shock absorber main body A that is extendable and contractible and has a cylinder 1 used as an outer tube and a rod 2 movably inserted into the cylinder 1; a damping passage DP that communicates between an extension side chamber R1 and a compression side chamber R2, which are used as two operating chambers provided in the shock absorber main body A; and a valve V provided in the damping passage DP. The shock absorber D is used by being interposed between a vehicle body and an axle in a non-illustrated vehicle in order to suppress vibrations of the vehicle body and a wheel.

Various parts of the shock absorber D will be described in detail below. As illustrated in FIG. 1, the shock absorber main body A includes the bottomed tubular cylinder 1 used as the outer tube, the rod 2 movably inserted into the cylinder 1, and a piston 3 that is movably inserted into the cylinder 1 by being connected to the rod 2 and partitions the inside of the cylinder 1 into the extension side chamber R1 and the compression side chamber R2 used as the operating chambers.

A bracket (not illustrated) is provided at a base end that is an upper end, in FIG. 1, of the rod 2, and the rod 2 is connected to one of the vehicle body and the axle via the non-illustrated bracket. A bracket (not illustrated) is also provided on a bottom portion 1*a* of the cylinder 1, and the cylinder 1 is connected to the other of the vehicle body and the axle via the non-illustrated bracket.

The shock absorber D is interposed between the vehicle body and the axle in this manner. Then, when the vehicle travels on an uneven road surface or the like and the wheels vibrate up and down with respect to the vehicle body, the rod 2 enters and exits the cylinder 1, the shock absorber D extends and contracts, and the piston 3 moves up and down (in the axial direction) in the cylinder 1.

In addition, the shock absorber main body A includes an annular rod guide 10 that closes the upper end of the cylinder 1 and through the inner circumference of which the rod 2 is slidably inserted. Therefore, the inside of the cylinder 1 is a sealed space. A free piston 11 is slidably inserted on the opposite side to the rod 2 as viewed from the piston 3 in the cylinder 1.

On the upper side of the free piston 11 in the cylinder 1, a liquid chamber L is formed, and on the lower side, a gas chamber G is formed. Besides, the piston 3 partitions the liquid chamber L into the extension side chamber R1 on the side of the rod 2 and the compression side chamber R2 on the side of the piston 3, and the extension side chamber R1 and the compression side chamber R2 are each filled with liquid. Note that examples of the liquid filled in the shock absorber main body A may include operating fluid, water, an aqueous solution, other liquids, and the like. On the other hand, the gas chamber G is filled with a gas such as air or nitrogen gas in a compressed state.

When the shock absorber D extends, the rod 2 exits the cylinder 1 and the inner volume of the cylinder increases due to the volume of the rod 2 that has exited, the free piston 11 moves upward in the cylinder 1 to enlarge the gas chamber G. On the contrary, when the shock absorber D contracts, the rod 2 enters the cylinder 1 and the inner volume of the cylinder decreases due to the volume of the rod 2 that has entered, the free piston 11 moves downward in the cylinder 1 to contract the gas chamber G.

Note that, instead of the free piston 11, a bladder, bellows, or the like can be used to partition the liquid chamber L and the gas chamber G and the configuration of the movable partition wall functioning as the partition can be changed as appropriate.

Besides, in the present embodiment, the shock absorber D is the single-rod, monotube shock absorber, and the free piston (the movable partition wall) 11 enlarges or contracts the gas chamber G when the shock absorber D extends and contracts to compensate for the volume of the rod 2 entering and exiting the cylinder 1. However, the configuration for compensating for the volume can be changed as appropriate.

For example, in a case where a shock absorber is configured as a twin tube shock absorber without the free piston (the movable partition wall) 11 and the gas chamber G by providing an outer shell on the outer circumference of the cylinder 1 and forming a reservoir storing liquid between the cylinder 1 and the outer shell, the reservoir may compensate for the volume of the rod 2 entering and exiting the cylinder 1. Note that the reservoir may be formed in a tank separated from the cylinder 1. In addition, the shock absorber D may be configured as a double rod type shock absorber in which the piston 3 is placed in the center of the rod 2 and the end portions of the rod 2 protrude to the outside of the cylinder 1 from both ends of the cylinder 1.

The rod 2 includes a small-diameter portion 2*a* provided on the tip side of the rod 2, a step portion 2*c* provided at the boundary between the small-diameter portion 2*a* and a large-diameter portion 2*b* on the upper side in FIG. 2 with respect to the small-diameter portion, and a screw portion 2*d* provided on the outer circumference of the tip of the small-diameter portion 2*a*.

Furthermore, the piston 3 is annular, is fitted to the outer circumference of the small-diameter portion 2*a* of the rod 2, and is fixed to the rod 2 by a piston nut 18 screwed to the screw portion 2*d* of the rod 2. More specifically, the piston 3 includes: an annular main body portion 3*a*; a cylindrical portion 3*b* provided on the outer circumference of the lower end, in FIG. 2, of the main body portion 3*a*; a plurality of extension side ports 3*c* provided on the same circumference of the main body portion 3*a* and penetrating the main body portion 3*a* in the axial direction; a plurality of compression side ports 3*d* provided on the same circumference on the outer circumferential side, from the extension side port 3*c*, of the main body portion 3*a* and penetrating the main body portion 3*a* in the axial direction; an annular extension side valve seat 3*e* provided between the extension side port 3*c* at the lower end, in FIG. 2, of the main body portion 3*a* and the compression side port 3*d* and surrounding the extension side port 3*c*; and a petal-type compression side valve seat 3*f* provided at the upper end, in FIG. 2, of the main body portion 3*a* and individually surrounding only the opening of the compression side port 3*d* by avoiding the extension side port 3*c*.

Continuing the description, on the lower surface of the piston 3 in FIG. 2, an extension side leaf valve 4 formed as a stacked leaf valve whose inner circumferential side is fixed to the small-diameter portion 2*a* of the rod 2 to open and close the extension side port 3*c*, and a spacer 5 that sets the position of the fulcrum of the bending of the extension side leaf valve 4, has an annular shape, and has an outer diameter smaller than that of the extension side leaf valve 4 are stacked. Furthermore, an annular valve case 6 whose inner circumference is fixed to the small-diameter portion 2*a* of the rod 2, an annular spacer 12, an annular valve stopper 13, a spacer 16, an annular valve body 14, a spacer 17, and an annular valve stopper 15 are stacked below the spacer 5.

In addition, on the upper surface, in FIG. 2, of the piston 3, a compression side leaf valve 7 formed as a stacked leaf valve whose inner circumferential side is fixed to the small-diameter portion 2*a* of the rod 2 to open and close the compression side port 3*d*, and a spacer 8 that sets the position of the fulcrum of the bending of the compression side leaf valve 7, is annular, and has an outer diameter smaller than that of the compression side leaf valve 7, and a stopper 9 are stacked.

These stopper 9, spacer 8, compression side leaf valve 7, piston 3, extension side leaf valve 4, spacer 5, valve case 6, spacer 12, valve stopper 13, spacer 16, annular valve body 14, spacer 17, and valve stopper 15 are sequentially assembled to the outer circumference of the small-diameter portion 2*a* of the rod 2, and are then fixed to the rod 2 by being sandwiched between the piston nut 18 screwed to the screw portion 2*d* at the tip of the rod 2 and the step portion 2*c* of the rod 2.

The extension side leaf valve 4 is a stacked leaf valve configured by stacking a plurality of annular plates, has the inner circumference fixed to the rod 2 as described above, is stacked on the lower end, in FIG. 2, of the piston 3, and is seated on the extension side valve seat 3*e* of the piston 3. On the outer circumference of the leaf valve stacked on the uppermost side in FIG. 2 and seated on the extension side valve seat 3*e* among the leaf valves constituting the extension side leaf valve 4, a notch orifice 4*a* is provided. Thus, in a state of being seated on the extension side valve seat 3*e*, the extension side leaf valve 4 communicates between the extension side port 3*c* surrounded by the extension side valve seat 3*e* and the compression side chamber R2 through only the notch orifice 4*a*.

When a differential pressure between the pressure in the extension side chamber R1 acting on the front surface side, which is defined as the extension side port side surface, across the extension side port 3*c* and the pressure in the compression side chamber R2 acting on the back surface side reaches a valve opening pressure, the extension side leaf valve 4 bends the outer circumference to be separated from the extension side valve seat 3*e*. When separated from the extension side valve seat 3*e*, the extension side leaf valve 4 forms an annular gap with the extension side valve seat 3*e*, communicates between the extension side port 3*c* and the compression side chamber R2 across the gap, and offers resistance to the flow of the liquid passing through the extension side port 3*c*. In the shock absorber D according to the present embodiment, the extension side leaf valve 4 opens when the extension speed of the shock absorber D is in the high-speed range, and offers resistance to the flow of the liquid from the extension side chamber R1 to the compression side chamber R2 through the extension side port 3*c*. In addition, the extension side leaf valve 4 sets the extension side port 3*c* as a one-way passage that allows only the flow of the liquid from the extension side chamber R1 to the compression side chamber R2.

In addition, the extension side valve seat 3*e* protrudes further downward in FIG. 2 than an abutment surface of the main body portion 3*a* in contact with the inner circumference of the extension side leaf valve 4, and a difference in height (height difference) is provided between the extension side valve seat 3*e* and the main body portion 3*a*; as a result, when the extension side leaf valve 4 is stacked on the piston 3 and the inner circumferential side is fixed to the outer circumference of the rod 2, the outer circumference of the extension side leaf valve 4 bends due to the height difference. As described above, the extension side leaf valve 4 is initially bent in advance, and the extension side leaf valve 4 presses itself against the extension side valve seat 3*e* using the resilient force exerted by itself. Thus, the extension side leaf valve 4 does not open until the force for bending the extension side leaf valve 4 due to the differential pressure between the extension side chamber R1 and the compression side chamber R2 overcomes the pressing force due to the resilient force described above, and the differential pressure at the time of valve opening is the valve opening pressure of the extension side leaf valve 4. Therefore, the valve opening pressure of the extension side leaf valve 4 can be adjusted by the bending stiffness of the extension side leaf valve 4 and the initial deflection amount given to the extension side leaf valve 4.

On the other hand, the compression side leaf valve 7 is a stacked leaf valve configured by stacking a plurality of annular plates, has the inner circumference fixed to the rod 2 as described above, is stacked on the upper end, in FIG. 2, of the piston 3, and is seated on the compression side valve seat 3*f* of the piston 3. The compression side leaf valve 7 closes only the compression side port 3*d* surrounded by the compression side valve seat 3*f* in a state of being seated on the compression side valve seat 3*f* but does not close the inlet of the extension side port 3*c*. When a differential pressure between the pressure in the compression side chamber R2 acting on the front surface side, which is defined as the compression side port side surface, and the pressure in the extension side chamber R1 acting on the back surface side across the compression side port 3*d* reaches a valve opening pressure, the compression side leaf valve 7 bends the outer circumference to be separated from the compression side valve seat 3*f* and open the compression side port 3*d*, and offers resistance to the flow of the liquid passing through the compression side port 3*d*. In the shock absorber D according to the present embodiment, the compression side leaf valve 7 opens when the extension speed of the shock absorber D is in the high-speed range, and offers resistance to the flow of the liquid from the compression side chamber R2 to the extension side chamber R1 through the compression side port 3*d*. In addition, the compression side leaf valve 7 sets the compression side port 3*d* as a one-way passage that allows only the flow of liquid from the compression side chamber R2 to the extension side chamber R1. Note that the valve opening pressure of the compression side leaf valve 7 is adjustable depending on the bending stiffness of the compression side leaf valve 7 and the initial deflection amount given to the compression side leaf valve 7, as in the extension side leaf valve 4. Note that, in place of the notch orifice 4*a* in the extension side leaf valve 4, or in addition to the notch orifice 4*a*, a notch orifice may be provided on the outer circumference of the leaf valve seated on the compression side valve seat 3*f* among the stacked leaf valves constituting the compression side leaf valve 7 or an orifice formed by notch or stamping may be provided on the compression side valve seat 3*f*.

Note that the extension side leaf valve 4 and the compression side leaf valve 7 are stacked leaf valves formed by stacking a plurality of annular plates, but the number of annular plates to be stacked can be changed depending on the damping force to be intended to occur in the shock absorber D as appropriate, and they can be a leaf valve formed as only one annular plate. In addition, the extension side leaf valve 4 and the compression side leaf valve 7 can be valves having a configuration other than the leaf valve or the stacked leaf valve, but the leaf valve or the stacked leaf valve using thin annular plates can enjoy the advantage of easily ensuring a stroke length of the shock absorber D without increasing the total length of the piston portion of the shock absorber D.

In addition, the extension side leaf valve 4 and the compression side leaf valve 7 are supported on their inner circumferences by the respective spacer 5, 8, and only their outer circumferential sides that are not supported by the spacer 5, 8 are allowed to bend. Thus, setting the outer diameter of the spacer 5, 8 makes it possible to change the positions of the fulcrums of the bending of the extension side leaf valve 4 and the compression side leaf valve 7. Note that the spacer 5, 8 may include a plurality of annular washers.

When the compression side leaf valve 7 bends greatly, the stopper 9 comes into contact with the outer circumference of the compression side leaf valve 7 to regulate further bending of the compression side leaf valve 7 and protect the compression side leaf valve 7.

Subsequently, the valve V includes the annular valve body 14 whose inner circumference is fixed to the outer circumference of the small-diameter portion 2*a* of the rod 2, a spacer 16, 17 stacked on both sides of the annular valve body 14 in the axial direction, a valve stopper 13, 15 facing the annular valve body 14 in the axial direction, and an annular facing portion 6*c* formed as an annular protrusion provided along the circumferential direction on the inner circumference of a cylindrical case portion 6*b* of the valve case 6.

The valve case 6 includes a fitting portion 6*a* having an annular shape and is fitted to the inner circumference of the cylindrical portion 3*b* of the piston 3, the case portion 6*b* having a cylindrical shape that protrudes downward from the outer circumferential portion of the lower end of the fitting portion 6*a*, and the annular facing portion 6*c* formed as an annular protrusion that protrudes to the inner circumferential side provided along the circumferential direction on the inner circumference of the case portion 6*b*. The space between the fitting portion 6*a* and the cylindrical portion 3*b* is closed with a seal 50, and on the fitting portion 6*a*, a sub port 6*d* is formed that is open to the inner circumferential side of the case portion 6*b* and penetrates the fitting portion 6*a* in the axial direction. In addition, the annular valve stopper 13, 15, the spacer 16, 17, and the annular valve body 14 with their inner circumferences placed in the outer circumference of the small-diameter portion 2*a* of the rod 2 are accommodated in the case portion 6*b*.

When the fitting portion 6*a* of the valve case 6 is fitted to the cylindrical portion 3*b* of the piston 3, a space C formed between the valve case 6 and the piston 3 communicates with the extension side chamber R1 through the extension side port 3*c* and the compression side port 3*d* and communicates with the compression side chamber R2 through the sub port 6*d*. Thus, the sub port 6*d* and the space C form the damping passage DP together with the extension side port 3*c* and the compression side port 3*d*.

Figure 3:
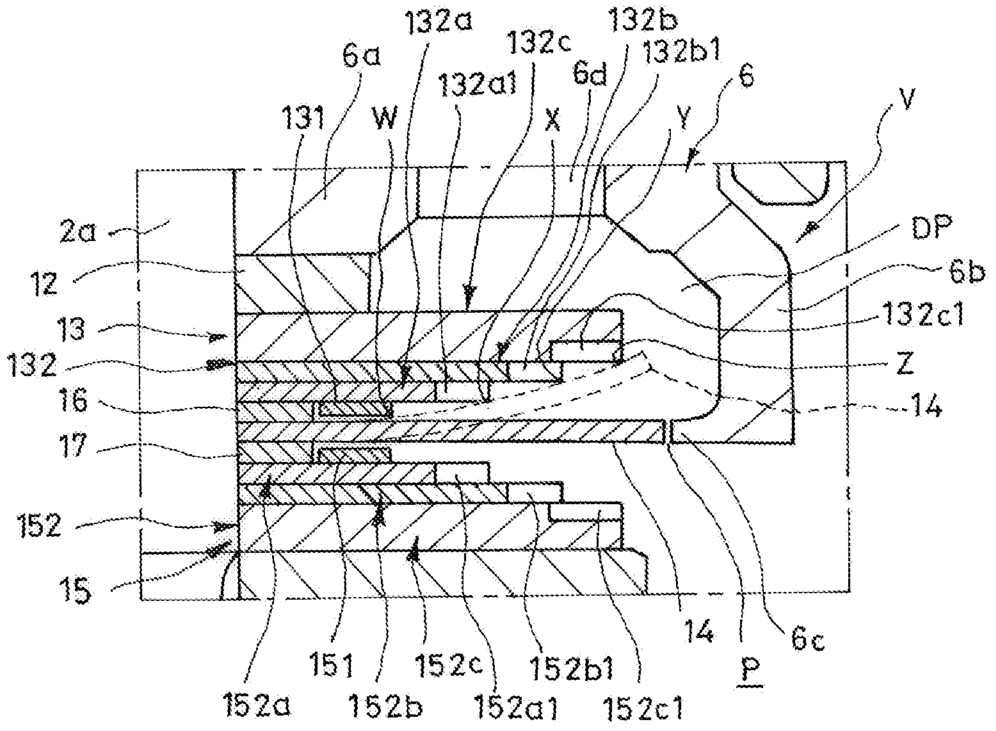
FIG. 3 is an enlarged cross-sectional view of the one embodiment of the present invention.

As illustrated in FIG. 3, the annular valve body 14 according to the present embodiment is annular and elastic, and has the fixed end in which the inner circumferential side is fixed to the small-diameter portion 2*a* of the rod 2, and the free end allowed to bend on the outer circumferential side. Note that the annular valve body 14 may be formed by stacking a plurality of leaf valves, and the number of leaf valves constituting the annular valve body 14 can be arbitrarily set according to the damping force desired to be obtained in the shock absorber D, and may be singular or plural.

The annular valve body 14 is fixed to the small-diameter portion 2*a* of the rod 2 while positioned at a position where the outer circumferential surface faces the inner circumferential surface of the annular facing portion 6*c* provided in the valve case 6. In addition, in the present embodiment, the annular valve body 14 is sandwiched between the spacers 16 and 17 having small-diameter inner circumferences. The spacer 16, 17 is an annular plate whose outer diameter is smaller than the outer diameter of the annular valve body 14 and inner diameter is equal to the inner diameter of the annular valve body 14, and the annular valve body 14 is fixed to the small-diameter portion 2*a* of the rod 2 in a state where its inner circumferential portion is sandwiched between the spacers 16 and 17. Therefore, the outer circumferential side of the annular valve body 14 can be elastically deformed and bent in the vertical direction in FIG. 2 at the outer circumferential edge of the spacer 16, 17 serving as a fulcrum. Note that each of the spacers 16 and 17 is formed as one annular plate as illustrated, but may be formed as a plurality of annular plates.

Subsequently, the valve stopper 13 arranged on the upper side, in FIG. 3, of the annular valve body 14 includes a ring 131 that is annular, has a thickness in the axial direction smaller than the thickness of the spacer 16, and is arranged on the outer circumference of the spacer 16, and a stacked annular plate 132 that is annular, has an outer diameter larger than the outer diameter of the ring 131, has different outer diameters, and has a plurality of annular plates 132*a*, 132*b*, and 132*c* stacked on the spacer 16 such that the outer diameter gradually increases stepwise toward the non-spacer side.

The ring 131 has an inner diameter larger than the outer diameter of the spacer 16 and an outer diameter smaller than the outer diameter of the annular valve body 14, has a thickness in the axial direction smaller than the thickness in the axial direction of the spacer 16, and is fixed to the annular plate 132*a* of the stacked annular plate 132 closest to the annular valve body 14 in contact with the spacer 16 by welding or adhesion.

The stacked annular plate 132 is configured by stacking the annular plates 132*a*, 132*b*, and 132*c* having an inner diameter equal to the inner diameter of the annular valve body 14 and the spacer 16, and an outer diameter larger than the outer diameter of the ring 131 and different from each other, on the non-annular-valve-body side of the spacer 16 in the ascending order of outer diameters. Therefore, the outer circumferential shape of the stacked annular plate 132 formed by stacking the annular plates 132*a*, 132*b*, and 132*c* has a larger diameter than the outer diameter of the ring 131, and has a changing shape such that the outer diameter gradually increases stepwise toward the non-spacer side. In addition, the outer diameter of the annular plate 132*a* is larger than the outer diameter of the ring 131, the outer diameter of the ring 131 is the smallest in the entire valve stopper 13, and the valve stopper 13 has an outer circumferential shape in which the outer diameter gradually increases stepwise toward the non-spacer side.

When the valve stopper 13 including the ring 131 and the stacked annular plate 132 configured as described above is stacked on the spacer 16, the ring 131 is concentrically arranged on the outer circumference of the spacer 16. Since the thickness of the ring 131 is smaller than the thickness of the spacer 16, the ring 131 and the annular valve body 14 face each other across an annular narrow gap. In addition, the stacked annular plate 132 faces the annular valve body 14 across an annular gap whose interval increases stepwise toward the outer circumference.

Therefore, as indicated by a broken line in FIG. 3, when the annular valve body 14 receives the pressure acting on the lower surface and bends and deforms the outer circumferential side that is the free end upward, the annular valve body 14 comes into contact with the outer circumference of the ring 131 of the valve stopper 13 and the outer circumferences of the annular plates 132*a*, 132*b*, and 132*c*, and is supported from the back surface side by the valve stopper 13, and regulates further bending.

As indicated by a broken line in FIG. 3, the thicknesses and the outer diameters of the ring 131 and the annular plates 132*a*, 132*b*, and 132*c* are set so that each of the outer circumference of the lower end of the ring 131, the outer circumference of the lower end of the annular plate 132*a*, the outer circumference of the lower end of the annular plate 132*b*, and the outer circumference of the lower end of the annular plate 132*c* in the valve stopper 13 is exactly in contact with the annular valve body 14 when the annular valve body 14 bends in an arc shape at the outer edge of the spacer 16 serving as a fulcrum.

Subsequently, the valve stopper 15 arranged on the lower side, in FIG. 3, of the annular valve body 14 includes a ring 151 that is annular, has a thickness in the axial direction smaller than the thickness of the spacer 17, and is arranged on the outer circumference of the spacer 17, and a stacked annular plate 152 that is annular, has an outer diameter larger than the outer diameter of the ring 151, has different outer diameters, and has a plurality of annular plates 152*a*, 152*b*, and 152*c* stacked on the spacer 17 such that the outer diameter gradually increases stepwise toward the non-spacer side.

The ring 151 has an inner diameter larger than the outer diameter of the spacer 17 and an outer diameter smaller than the outer diameter of the annular valve body 14, has a thickness in the axial direction smaller than the thickness in the axial direction of the spacer 17, and is fixed to the annular plate 152*a* of the stacked annular plate 152 closest to the annular valve body 14 in contact with the spacer 17 by welding or adhesion. Note that the ring 151 may have a C-shape instead of the annular shape as long as the ring is annular.

The stacked annular plate 152 is configured by stacking the annular plates 152*a*, 152*b*, and 152*c* having an inner diameter equal to the inner diameter of the annular valve body 14 and the spacer 17, and an outer diameter larger than the outer diameter of the ring 151 and different from each other, on the non-annular-valve-body side of the spacer 17 in the ascending order of outer diameters. Therefore, the outer circumferential shape of the stacked annular plate 152 formed by stacking the annular plates 152*a*, 152*b*, and 152*c* has a larger diameter than the outer diameter of the ring 151, and has a changing shape such that the outer diameter gradually increases stepwise toward the non-spacer side. In addition, the outer diameter of the annular plate 152*a* is larger than the outer diameter of the ring 151, the outer diameter of the ring 151 is the smallest in the entire valve stopper 15, and the valve stopper 15 has an outer circumferential shape in which the outer diameter gradually increases stepwise toward the non-spacer side.

When the valve stopper 15 including the ring 151 and the stacked annular plate 152 configured as described above is stacked on the spacer 17, the ring 151 is concentrically arranged on the outer circumference of the spacer 17. Since the thickness of the ring 151 is smaller than the thickness of the spacer 17, the ring 151 and the annular valve body 14 face each other across an annular narrow gap. In addition, the stacked annular plate 152 faces the annular valve body 14 across an annular gap whose interval increases stepwise toward the outer circumference.

Therefore, when the annular valve body 14 receives the pressure acting on the upper surface and bends and deforms the outer circumferential side that is the free end downward, the annular valve body 14 comes into contact with the outer circumference of the ring 151 of the valve stopper 15 and the outer circumferences of the annular plates 152*a*, 152*b*, and 152*c*, and is supported from the back surface side by the valve stopper 15, and regulates further bending.

The thicknesses and the outer diameters of the ring 151 and the annular plates 152*a*, 152*b*, and 152*c* are set so that each of the outer circumference of the upper end of the ring 151, the outer circumference of the upper end of the annular plate 152*a*, the outer circumference of the upper end of the annular plate 152*b*, and the outer circumference of the upper end of the annular plate 152*c* in the valve stopper 15 is exactly in contact with the annular valve body 14 when the annular valve body 14 bends in an arc shape at the outer edge of the spacer 17 serving as a fulcrum.

As described above, the annular plates 132*a*, 132*b*, and 132*c* (152*a*, 152*b*, and 152*c*) of the stacked annular plate 132 (152), together with the ring 131 (151), form support points W, X, Y, and Z that support the annular valve body 14 at the outer circumferential edge on the annular valve body side. As illustrated in FIG. 3, in a state where the annular valve body 14 is supported by the valve stopper 13 (15), the annular valve body 14 can be supported at a plurality of support points from the inner circumference to the outer circumference, so that the annular valve body 14 is not undulated but can be maintained in a state of being bent in a gentle arcuate shape with an arc-shaped cross section. As can be understood from FIG. 3, when the annular valve body 14 arcuately bends at the outer edge of the spacer 16 (17) serving as a fulcrum, the deflection amount is small in the vicinity of the spacer 16 (17), and the deflection amount increases toward the outer circumference of the annular valve body 14. Therefore, in order to maintain the annular valve body 14 in an arcuately bent state without being undulated, it is necessary to provide the support point W at a position slightly lower in the axial direction than the support position of the spacer 16 (17) in the vicinity of the spacer 16 (17). In the valve V of the present embodiment, even if a special spacer having an extremely small thickness in the axial direction is not used for the spacer 16, 17, the ring 131, 151 slightly thinner than the spacer 16, 17 is arranged on the outer circumferences of the spacer 16, 17, so that it is possible to provide the support point W in the vicinity of the spacer 16, 17 with a small deflection amount of the annular valve body 14.

In addition, since the deflection amount increases on the outer circumferential side of the annular valve body 14, it is possible to support the annular valve body 14 and prevent the undulation and deformation without reducing the thickness of each of the annular plates 132*a*, 132*b*, and 132*c* (152*a*, 152*b*, and 152*c*) of the stacked annular plate 132 (152). It can be understood from FIG. 3 that since the deflection amount increases on the outer circumferential side of the annular valve body 14 and the thickness of each of the annular plates 132*a*, 132*b*, and 132*c* (152*a*, 152*b*, and 152*c*) is constant, the interval between the support points on the outer circumferential side of the annular valve body 14 is narrowed. That is, in the valve V of the present embodiment, since the thickness of each of the annular plates 132*a*, 132*b*, and 132*c* (152*a*, 152*b*, and 152*c*) is constant, there is a relationship in which the outer diameter difference between the adjacent annular plates of the stacked annular plate 132 (152) decreases as the distance from the annular valve body 14 increases; however, when the thickness of each of the annular plates 132*a*, 132*b*, and 132*c* (152*a*, 152*b*, and 152*c*) is different from each other, the interval between the support points can be arbitrarily adjusted. Furthermore, the number of support points supporting the annular valve body 14 can be easily changed by changing the number of stacked annular plates in the stacked annular plate 132 (152).

As described above, in the valve V of the present embodiment, the stacked annular plate 132 (152) is formed of the three annular plates 132*a*, 132*b*, and 132*c* (152*a*, 152*b*, and 152*c*), but the number of the annular plates can be arbitrarily changed as long as the annular valve body 14 can be supported so that the cross-sectional shape of the annular valve body 14 is arcuate when the annular valve body 14 bends. Therefore, when the number of support points of the annular valve body 14 is two, the stacked annular plate stacked on the ring 131 (151) and the spacer 16 (17) may be formed as one annular plate larger than the outer diameter of the ring 131 (151). However, when the annular valve body 14 is supported at four or more support points including the ring 131 (151), the interval between the support points in the radial direction of the valve stopper 13 (15) is not too wide, and thus the annular valve body 14 can be stably supported. If the interval between the support points is too wide, the annular valve body 14 under pressure undulates between the support points and deforms so as to protrude toward the valve stopper 13 (15), and excessive stress acts on the annular valve body 14; thus, the interval between the support points may be set so as to prevent such deformation. The rings 131 and 151 are attached to the annular plates 132*a* and 152*a*, respectively, but may be attached to the annular valve body 14. Even in this case, when the annular valve body 14 bends and the ring 131,151 comes into contact with the annular plate 132*a*, 152*a* and is supported by the valve stopper 13, 15, the outer circumference of the ring 131, 151 serves as the support point for supporting the annular valve body 14, and thus the annular valve body 14 can be maintained in an arcuate bent state without being undulated when the annular valve body 14 bends. Furthermore, instead of using the plurality of annular plates 132*a*, 132*b*, and 132*c* (152*a*, 152*b*, and 152*c*) having different outer diameters, the stacked annular plate 132 (152) may be formed as one annular plate whose outer diameter gradually increases stepwise toward the non-spacer side.

The valve case 6, the valve stopper 13, the spacer 16, the annular valve body 14, the spacer 17, and the valve stopper 15 are sequentially stacked on the lower side, in FIG. 2, of the extension side leaf valve 4, assembled to the outer circumference of the small-diameter portion 2*a* of the rod 2, and then fixed to the rod 2 by the piston nut 18 screwed to the screw portion 2*d* of the rod 2. Then, as illustrated in FIG. 3, the annular valve body 14 has the outer circumferential surface facing the inner circumferential surface of the annular facing portion 6*c* with the inner circumference fixed, and thus the annular valve body 14 faces the annular facing portion 6*c* with a predetermined annular gap P therebetween. The piston nut 18 may be integrated with the annular plate 152*c* having the largest outer diameter in the stacked annular plate 152 of the valve stopper 15 and function as a part of the stacked annular plate 152.

In a state where the shock absorber D is stopped without extension or contraction, the annular valve body 14 does not bend and is maintained in the initial mounting state illustrated in FIG. 3. In a state where the annular valve body 14 is not bent as described above, the annular valve body 14 faces the annular facing portion 6*c* with the outer circumferential surface facing the inner circumferential surface of the annular facing portion 6*c* and with a predetermined annular gap P therebetween, as illustrated in FIG. 3. In the shock absorber D according to the present embodiment, the annular gap P formed between the annular valve body 14 and the annular facing portion 6*c* that face each other is very narrow and has an opening area smaller than that of the notch orifice 4*a* described above.

On the other hand, when the shock absorber D starts to move (extends and contracts), the annular valve body 14 bends and the deflection amount of the annular valve body 14 increases as the extension/contraction speed increases. When the extension/contraction speed of the shock absorber D is close to 0 (zero) such as when the shock absorber D starts to move, the deflection amount of the annular valve body 14 is very small and the annular valve body 14 bends to the extent that it can no longer face the inner circumferential surface of the annular facing portion 6*c* between the very low-speed range and the low-speed range, and then the annular valve body 14 opens. Furthermore, when the extension speed of the shock absorber D is in the low-speed range or the high-speed range, the outer circumferential portion of the annular valve body 14 bends greatly downward at the outer circumferential edge of the spacer 17 serving as the bending fulcrum. On the contrary, when the contraction speed of the shock absorber D is in the low-speed range or the high-speed range, the outer circumferential portion of the annular valve body 14 bends greatly upward at the outer circumferential edge of the spacer 16 serving as the bending fulcrum. The differential pressure between the extension side chamber R1 and the compression side chamber R2 when the annular valve body 14 bends and is separated from the annular facing portion 6*c* to open, that is, the valve opening pressure of the annular valve body 14 is lower than that of the extension side leaf valve 4 and the compression side leaf valve 7, and when the extension/contraction speed is in the low-speed range, the annular valve body 14 opens as described above while the extension side leaf valve 4 and the compression side leaf valve 7 do not open, and the liquid flows back and forth between the extension side chamber R1 and the compression side chamber R2 through the notch orifice 4*a*.

When the annular gap P is set to be substantially zero in a state where the annular valve body 14 faces the inner circumferential surface of the annular facing portion 6*c*, the differential pressure occurs between the extension side chamber R1 and the compression side chamber R2 immediately upon the start of the shock absorber D to move, and thus the shock absorber D can quickly generate a damping force when switching between extension and contraction.

As described above, in the low-speed range and the high-speed range where the outer circumferential portion of the annular valve body 14 bends vertically, the opening area of the annular gap formed between the annular valve body 14 shifted vertically and the annular facing portion 6*c* becomes larger than the opening area of the notch orifice 4*a*.

In addition, during the contraction of the shock absorber D, when the flow rate of the liquid flowing through the damping passage DP increases and the annular valve body 14 bends greatly, the valve stopper 13 located above the annular valve body 14 comes into contact with and supports the upper end surface, in FIG. 3, of the annular valve body 14, and suppresses the bending of the annular valve body 14 toward the upper side in FIG. 3 to protect the annular valve body 14. The annular plates 132*a*, 132*b*, and 132*c* of the valve stopper 13 has notches 132*a*1, 132*b*1, and 132*cl*, respectively, on the outer circumference. Even when the annular valve body 14 comes into contact with the valve stopper 13, the notches 132*a*1, 132*b*1, and 132*cl* cause the gap defined by the annular valve body 14 and the valve stopper 13 to communicate outward, thereby preventing the gap from becoming a closed space. The installation of these notches 132*a*1, 132*b*1, and 132*cl* prevents the annular valve body 14 from absorbing to the valve stopper 13 even when the annular valve body 14 comes into contact with the valve stopper 13. Therefore, a delay in the closing of the annular valve body 14 is blocked when the annular valve body 14 comes into contact with the valve stopper 13 and then operates toward the valve closing side.

Furthermore, during the extension of the shock absorber D, when the flow rate of the liquid flowing through the damping passage DP increases and the annular valve body 14 bends greatly, the valve stopper 15 located below the annular valve body 14 comes into contact with and supports the lower end surface, in FIG. 3, of the annular valve body 14, and suppresses the bending of the annular valve body 14 toward the lower side in FIG. 3 to protect the annular valve body 14. The annular plates 152*a*, 152*b*, and 152*c* of the valve stopper 15 has notches 152*a*1, 152*b*1, and 152*cl*, respectively, on the outer circumference. Even when the annular valve body 14 comes into contact with the valve stopper 15, the notches 152*a*1, 152*b*1, and 152*cl* cause the gap defined by the annular valve body 14 and the valve stopper 15 to communicate outward, thereby preventing the gap from becoming a closed space. The installation of these notches 152*a*1, 152*b*1, and 152*cl* prevents the annular valve body 14 from absorbing to the valve stopper 15 even when the annular valve body 14 comes into contact with the valve stopper 15. Therefore, a delay in the closing of the annular valve body 14 is blocked when the annular valve body 14 comes into contact with the valve stopper 15 and then operates toward the valve closing side.

As described above, the liquid passes through the extension side leaf valve 4 and the annular valve body 14 in the valve V when flowing through the damping passage DP from the extension side chamber R1 to the compression side chamber R2, and passes through the compression side leaf valve 7 and the annular valve body 14 in the valve V when flowing through the damping passage DP from the compression side chamber R2 to the extension side chamber R1. In this manner, the valve V is provided in series with the extension side leaf valve 4 and the compression side leaf valve 7 in the damping passage DP.

Hereinafter, the operation of the shock absorber D according to the present embodiment will be described. When the shock absorber D extends, the piston 3 moves upward in the cylinder 1 to compress the extension side chamber R1. When the extension speed of the shock absorber D is in the very low-speed range and is close to zero, the pressure in the extension side chamber R1 rises, but the differential pressure between the extension side chamber R1 and the compression side chamber R2 does not reach the valve opening pressure of the extension side leaf valve 4; thus, the extension side leaf valve 4 does not open and the extension side port 3*c* remains closed. The compression side leaf valve 7 is under the pressure in the extension side chamber R1 from the back surface side and closes the compression side port 3*d*. When the extension speed of the shock absorber D is in the very low-speed range and is close to zero, the pressure in the extension side chamber R1 rises but the differential pressure between the extension side chamber R1 and the compression side chamber R2 does not reach the valve opening pressure of the annular valve body 14; thus, even if the annular valve body 14 bends, the outer circumferential surface faces the range of the axial width of the inner circumference of the annular facing portion 6*c*, resulting in the valve closing state, which maintains the flow path area of the annular gap P between the annular valve body 14 and the annular facing portion 6*c* to be extremely small. Besides, while the extension speed of the shock absorber D increases and the very low-speed range shifts to the low-speed range, the differential pressure between the pressure in the extension side chamber R1 and the pressure in the compression side chamber R2 exceeds the valve opening pressure of the annular valve body 14; thus, the annular valve body 14 bends to open so that the outer circumference deviates downward in FIG. 3 from the range of the axial width of the inner circumference of the annular facing portion 6*c*, which increases the flow path area of the annular gap P between the annular valve body 14 and the annular facing portion 6*c*.

Figure 4:
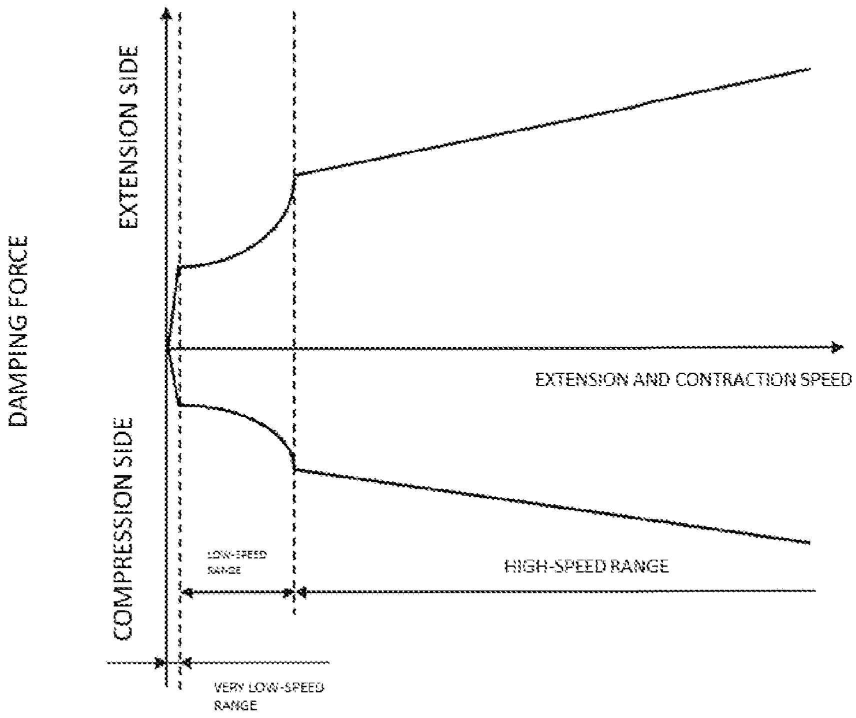
FIG. 4 is a graph showing a damping force characteristic of the shock absorber including the valve according to the embodiment of the present invention.

Then, the liquid moves from the extension side chamber R1 to the compression side chamber R2 through the notch orifice 4*a*, the extension side port 3*c*, the space C, the sub port 6*d*, and the annular gap P. The liquid, when passing through the damping passage DP as described above, passes through the notch orifice 4*a* and the annular gap P, but the flow path area of the annular gap P in the annular valve body 14 in the valve opening state in the very low-speed range is smaller than that of the notch orifice 4*a*. Therefore, when the extension speed of the shock absorber D is in the very low-speed range, the shock absorber D generates a damping force that interferes with the extension mainly due to the resistance offered to the liquid by the annular valve body 14. Thus, when the extension speed of the shock absorber D is in the very low-speed range, the damping force characteristics on the extension side of the shock absorber D (characteristics of the damping force with respect to the extension speed of the shock absorber D) are such that the damping coefficient rises very greatly when the extension speed is near zero and then decreases when the annular valve body 14 opens, as illustrated in FIG. 4.

When the extension speed of the shock absorber D goes beyond the very low-speed range and falls in the low-speed range, the pressure in the extension side chamber R1 rises, but the differential pressure between the pressure in the extension side chamber R1 and the pressure in the compression side chamber R2 does not reach the valve opening pressure of the extension side leaf valve 4; thus, the extension side leaf valve 4 still does not open and the extension side port 3*c* remains closed. The compression side leaf valve 7 is under the pressure in the extension side chamber R1 from the back surface side and closes the compression side port 3*d*. When the extension speed of the shock absorber D is in the low-speed range, the differential pressure between the pressure in the extension side chamber R1 and the pressure in the compression side chamber R2 exceeds the valve opening pressure of the annular valve body 14 and thus the annular valve body 14 bends to open so that the outer circumference deviates downward in FIG. 3 from the range of the axial width of the inner circumference of the annular facing portion 6*c*, which increases the flow path area of the annular gap P between the annular valve body 14 and the annular facing portion 6*c*. Thus, in this case as well, the liquid moves from the extension side chamber R1 to the compression side chamber R2 through the notch orifice 4*a*, the extension side port 3*c*, the space C, the sub port 6*d*, and the annular gap P, but the flow path area of the annular gap P becomes larger than the flow path area of the notch orifice 4*a*. Therefore, when the extension speed of the shock absorber D is in the low-speed range, the shock absorber D generates a damping force that interferes with the extension mainly due to the resistance offered to the liquid by the notch orifice 4*a*. Thus, when the extension speed of the shock absorber D is in the very low-speed range, the damping force characteristics on the extension side of the shock absorber D are such that the damping force is proportional to the square of the extension speed of the shock absorber D, as is peculiar to the orifice and as illustrated in FIG. 4, but the damping coefficient becomes smaller than when the extension speed is in the very low-speed range.

Besides, when the extension speed of the shock absorber D goes beyond the low-speed range and falls in the high-speed range, the differential pressure between the pressure in the extension side chamber R1 and the pressure in the compression side chamber R2 reaches the valve opening pressure of the extension side leaf valve 4, and the extension side leaf valve 4 bends and opens, which causes the extension side port 3*c* to be opened. The compression side leaf valve 7 is under the pressure in the extension side chamber R1 from the back surface side and closes the compression side port 3*d*. When the extension speed of the shock absorber D is in the high-speed range, the differential pressure between the pressure of the extension side chamber R1 and the pressure of the compression side chamber R2 exceeds the valve opening pressure of the annular valve body 14, which opens the annular valve body 14 and increases the flow passage area of the annular gap P between the annular valve body 14 and the annular facing portion 6*c*. The liquid moves from the extension side chamber R1 to the compression side chamber R2 through between the extension side leaf valve 4 and the extension side valve seat 3*e*, the extension side port 3*c*, the space C, the sub port 6*d*, and the annular gap P. When the extension speed of the shock absorber D is in the high-speed range, since the flow rate of the liquid moving from the extension side chamber R1 to the compression side chamber R2 increases, the annular valve body 14 bends greatly, and thus the flow path area in the gap between the extension side leaf valve 4 and the extension side valve seat 3*e* becomes smaller than that in the annular gap P. Thus, when the extension speed of the shock absorber D is in the high-speed range, the shock absorber D generates a damping force that interferes with the extension mainly due to the resistance offered to the liquid by the extension side leaf valve 4. Therefore, when the extension speed of the shock absorber D is in the high-speed range, the damping force characteristics on the extension side of the shock absorber D are such that the damping force is proportional to the extension speed of the shock absorber D, as is peculiar to the extension side leaf valve 4 and as illustrated in FIG. 4, but the damping coefficient becomes further smaller than when the extension speed is in the low-speed range.

In addition, the annular valve body 14 bends greatly and comes into contact with the valve stopper 15, and is supported by the valve stopper 15 from the back side to suppress the bending. The valve stopper 15 causes the lower surface, in FIG. 3, of the annular valve body 14 to come into contact with the outer circumference of the ring 151 and the outer circumference of each of the annular plates 152*a*, 152*b*, and 152*c* of the stacked annular plate 152 as support points. Since the plurality of support points of the valve stopper 15 are arranged on the same arc when viewed from the side, the annular valve body 14 supported by each support point of the valve stopper 15 is supported in a state of being arcuately deformed with an arc-shaped cross section, and is maintained in that state without causing undulating deformation.

Subsequently, when the shock absorber D contracts, the piston 3 moves downward in the cylinder 1 to compress the compression side chamber R2. When the contraction speed of the shock absorber D is in the very low-speed range and is close to zero, the pressure in the compression side chamber R2 rises, but the differential pressure between the compression side chamber R2 and the extension side chamber R1 does not reach the valve opening pressure of the compression side leaf valve 7; thus, the compression side leaf valve 7 does not open and the compression side port 3*d* remains closed. The extension side leaf valve 4 is under the pressure in the compression side chamber R2 from the back surface side and closes the extension side port 3*c*. When the contraction speed of the shock absorber D is in the very low-speed range and is close to zero, the pressure in the compression side chamber R2 rises but the differential pressure between the compression side chamber R2 and the extension side chamber R1 does not reach the valve opening pressure of the annular valve body 14; thus, even if the annular valve body 14 bends, the outer circumferential surface faces the range of the axial width of the inner circumference of the annular facing portion 6*c*, resulting in the valve closing state, which maintains the flow path area of the annular gap P between the annular valve body 14 and the annular facing portion 6*c* to be extremely small.

Besides, while the contraction speed of the shock absorber D increases and the very low-speed range shifts to the low-speed range, the differential pressure between the pressure in the compression side chamber R2 and the pressure in the extension side chamber R1 exceeds the valve opening pressure of the annular valve body 14; thus, the annular valve body 14 bends to open so that the outer circumference deviates upward in FIG. 3 from the range of the axial width of the inner circumference of the annular facing portion 6*c*, which increases the flow path area of the annular gap P between the annular valve body 14 and the annular facing portion 6*c*.

Then, the liquid moves from the compression side chamber R2 to the extension side chamber R1 through the annular gap P, the sub port 6*d*, the space C, the extension side port 3*c*, and the notch orifice 4*a*. The liquid, when passing through the damping passage DP as described above, passes through the notch orifice 4*a* and the annular gap P, but the flow path area of the annular gap P in the annular valve body 14 in the valve opening state in the very low-speed range is smaller than that of the notch orifice 4*a*. Therefore, when the contraction speed of the shock absorber D is in the very low-speed range, the shock absorber D generates a damping force that interferes with the contraction mainly due to the resistance offered to the liquid by the annular valve body 14. Thus, when the contraction speed of the shock absorber D is in the very low-speed range, the damping force characteristics on the compression side of the shock absorber D are such that the damping coefficient rises very greatly and then decreases when the annular valve body 14 opens, as illustrated in FIG. 4.

When the contraction speed of the shock absorber D goes beyond the very low-speed range and falls in the low-speed range, the pressure in the compression side chamber R2 rises, but the differential pressure between the compression side chamber R2 and the extension side chamber R1 does not reach the valve opening pressure of the compression side leaf valve 7; thus, the compression side leaf valve 7 still does not open and the compression side port 3*d* remains closed. The extension side leaf valve 4 is under the pressure in the compression side chamber R2 from the back surface side and closes the extension side port 3*c*. When the contraction speed of the shock absorber D is in the low-speed range, the differential pressure between the pressure in the compression side chamber R2 and the pressure in the extension side chamber R1 exceeds the valve opening pressure of the annular valve body 14 and thus the annular valve body 14 bends to open so that the outer circumference deviates upward in FIG. 3 from the range of the axial width of the inner circumference of the annular facing portion 6*c*, which increases the flow path area of the annular gap P between the annular valve body 14 and the annular facing portion 6*c*. Thus, in this case as well, the liquid moves from the compression side chamber R2 to the extension side chamber R1 through the annular gap P, the sub port 6*d*, the space C, the extension side port 3*c*, and the notch orifice 4*a*, but the flow path area of the annular gap P becomes larger than that of the notch orifice 4*a*. Therefore, when the contraction speed of the shock absorber D is in the low-speed range, the shock absorber D generates a damping force that interferes with the contraction mainly due to the resistance offered to the liquid by the notch orifice 4*a*. Thus, when the contraction speed of the shock absorber D is in the low-speed range, the damping force characteristics on the compression side of the shock absorber D are such that the damping force is proportional to the square of the contraction speed of the shock absorber D, as is peculiar to the orifice and as illustrated in FIG. 4, but the damping coefficient becomes smaller than when the contraction speed is in the very low-speed range.

Besides, when the contraction speed of the shock absorber D goes beyond the low-speed range and falls in the high-speed range, the differential pressure between the pressure in the extension side chamber R1 and the pressure in the compression side chamber R2 reaches the differential pressure that is the valve opening pressure of the compression side leaf valve 7, and the compression side leaf valve 7 bends and opens, which causes the compression side port 3*d* to be opened. The extension side leaf valve 4 is under the pressure in the compression side chamber R2 from the back surface side and closes the extension side port 3*c*. When the contraction speed of the shock absorber D is in the high speed range, the differential pressure between the pressure of the compression side chamber R2 and the pressure of the extension side chamber R1 exceeds the valve opening pressure of the annular valve body 14; as a result, the annular valve body 14 opens, which increases the flow passage area of the annular gap P between the annular valve body 14 and the annular facing portion 6*c*. The liquid moves from the compression side chamber R2 to the extension side chamber R1 through the annular gap P, the sub port 6*d*, the space C, the compression side port 3*d*, and between the compression side leaf valve 7 and the compression side valve seat 3*f*. When the contraction speed of the shock absorber D is in the high-speed range, since the flow rate of the liquid moving from the compression side chamber R2 to the extension side chamber R1 increases, the annular valve body 14 bends greatly, and thus the flow path area in the gap between the compression side leaf valve 7 and the compression side valve seat 3*f* becomes smaller than that in the annular gap P. Thus, when the contraction speed of the shock absorber D is in the high-speed range, the shock absorber D generates a damping force that interferes with the contraction mainly due to the resistance offered to the liquid by the compression side leaf valve 7. Therefore, when the contraction speed of the shock absorber D is in the high-speed range, the damping force characteristics on the compression side of the shock absorber D are such that the damping force is proportional to the contraction speed of the shock absorber D, as is peculiar to the compression side leaf valve 7 and as illustrated in FIG. 4, but the damping coefficient becomes further smaller than when the contraction speed is in the low-speed range.

In addition, the annular valve body 14 bends greatly and comes into contact with the valve stopper 13, and is supported by the valve stopper 13 from the back side to suppress the bending. The valve stopper 13 causes the upper surface, in FIG. 3, of the annular valve body 14 to come into contact with the outer circumference of the ring 131 and the outer circumference of each of the annular plates 132*a*, 132*b*, and 132*c* of the stacked annular plate 132 as support points. Since the plurality of support points of the valve stopper 13 are arranged on the same arc when viewed from the side, the annular valve body 14 supported by each support point W, X, Y, and Z of the valve stopper 13 is supported in a state of being arcuately deformed with an arc-shaped cross section, and is maintained in that state without causing undulating deformation.

The valve V and the shock absorber D according to the present embodiment operate as described above. The valve V of the present embodiment includes: the annular valve body 14 that has elasticity and is allowed to bend on the outer circumference serving as the free end; the spacer 16, 17 that is annular, has an outer diameter smaller than the outer diameter of the annular valve body 14, is stacked on the annular valve body 14, and serves as a fulcrum of the bending of the free end of the annular valve body 14; and the valve stopper 13, 15 that faces the annular valve body 14 in the axial direction on the spacer 16, 17 side of the annular valve body 14 and regulates the bending of the annular valve body 14 when the annular valve body 14 bends and comes into contact therewith, wherein the valve stopper 13, 15 includes: the ring 131, 151 that is annular, has a thickness in the axial direction smaller than the thickness of the spacer 16, 17, and is arranged on the outer circumference of the spacer 16, 17; and the stacked annular plate 132, 152 that is annular, has an outer diameter larger than the outer diameter of the ring 131, 151, and is stacked on the spacer 16, 17.

In the valve V of the present embodiment configured as described above, since the valve stopper 13 (15) supports the vicinity of the spacer 16 (17) having a small deflection amount of the annular valve body 14 that arcuately bends at the outer edge of the spacer 16 (17) serving as a fulcrum, at the ring 131 (151) having a thickness smaller than the thickness of the spacer 16, 17, and supports the outer circumferential side of the annular valve body 14 having a large deflection amount at the stacked annular plate 132 (152), it is possible to regulate the bending of the annular valve body 14 without undulating and deforming the annular valve body 14. Therefore, according to the valve V of the present embodiment, since it is not necessary to use a special ultra-thin spacer in order to prevent the annular valve body 14 from being undulated and deformed, the work load of an operator when assembling the valve V can be reduced, and the inexpensive spacer 16 (17) can be used, which makes the valve V inexpensive and the assemblability of the valve V excellent. In addition, since the undulation and deformation of the annular valve body 14 in the valve V is prevented, the durability of the annular valve body 14 can be improved.

Furthermore, in the valve V of the present embodiment, the stacked annular plate 132 (152) includes a plurality of annular plates 132*a*, 132*b*, and 132*c* (152*a*, 152*b*, and 152*c*) that have different outer diameters and are stacked such that the outer diameter gradually increases stepwise toward the non-spacer side. According to the valve V configured as described above, since a plurality of support points for supporting the annular valve body 14 at the annular plates 132*a*, 132*b*, and 132*c* (152*a*, 152*b*, and 152*c*) are provided in addition to the ring 131 (151), which can eliminate a large interval between the support points, the annular valve body 14 can be uniformly supported from the inner circumference to the outer circumference to effectively prevent the annular valve body 14 from being undulated and deformed and effectively improve the durability; in addition, the number of support points can be easily changed by changing the number of stacked annular plates 132*a*, 132*b*, and 132*c* (152*a*, 152*b*, and 152*c*).

The valve V of the present embodiment includes the annular valve body 14, the annular facing portion 6*c* facing the free end of the annular valve body 14 across the annular gap P, and the spacer 16, 17 and the valve stopper 13, 15 on both sides of the annular valve body 14 in the axial direction. According to the valve V configured as described above, when the extension/contraction speed of the shock absorber D is in the very low-speed range, the damping coefficient is made very large so that the shock absorber D can exhibit damping force characteristics such that the damping force greatly rises with an increase in the extension/contraction speed, thereby improving the ride quality in a vehicle. In addition, according to the valve V configured as described above, since the opening area of the annular gap P can be adjusted by changing the size of the outer diameter of the annular valve body 14, the damping force characteristics can be easily adjusted by replacing the annular valve body 14 having different outer diameters.

Figure 5:
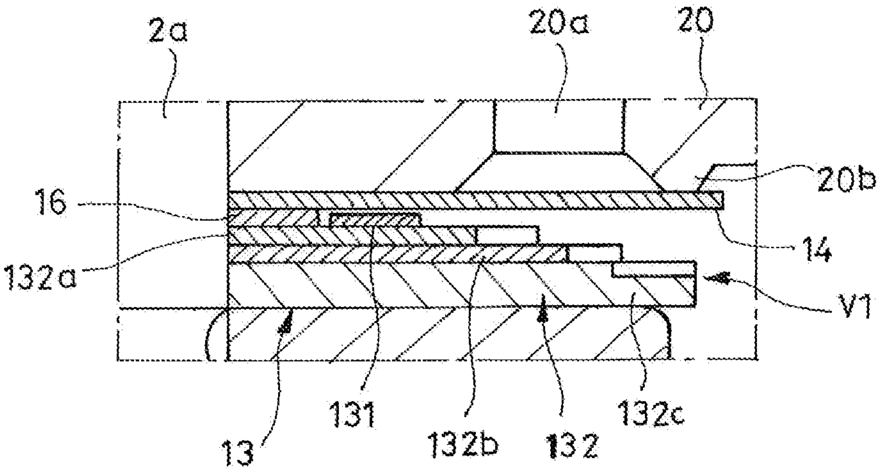
FIG. 5 is a cross-sectional view of the valve according to a first modification of the one embodiment of the present invention.

The valve V of the present embodiment includes the annular valve body 14 and the annular facing portion 6*c*, and bends according to both the flows of the liquid in the damping passage DP, the flow of the liquid from the extension side chamber R1 to the compression side chamber R2 and the flow of the liquid from the compression side chamber R2 to the extension side chamber R1, to offer resistance to the flow of the liquid. Alternatively, as illustrated in FIG. 5, a valve V1 of a first modification of one embodiment may include an annular valve body 14 and a valve disc 20 having a port 20*a* and a valve seat 20*b* surrounding an outlet end of the port 20*a*, and may employ a configuration in which the annular valve body 14 having an inner circumference immovable to the valve disc 20 as a fixed end and an outer circumference as a free end is separated and seated on the valve seat 20*b* to open and close the port 20*a*. As described above, in the valve V1 having a structure in which, at the time of valve opening, the annular valve body 14 receives pressure from the port 20*a* side and bends the outer circumference serving as the free end only in a direction away from the valve disc 20, a spacer 16 and a valve stopper 13 may be provided only on a non-valve-disc side of the annular valve body 14 to regulate the bending of the annular valve body 14. Therefore, the leaf valve 4 and 7 on the extension side and the compression side stacked on the piston 3 of the shock absorber D may be formed as an annular valve body, the spacers 16 and 17 may be stacked on the non-piston side of the leaf valve 4 and 7, respectively, and the valve stopper 13 and 15 may be provided on the non-leaf-valve side of the spacer 16 and 17, respectively, so that the leaf valve 4 and 7 bent by the valve stopper 13 and 15 may be supported in an arcuately deformed state.

Figure 6:
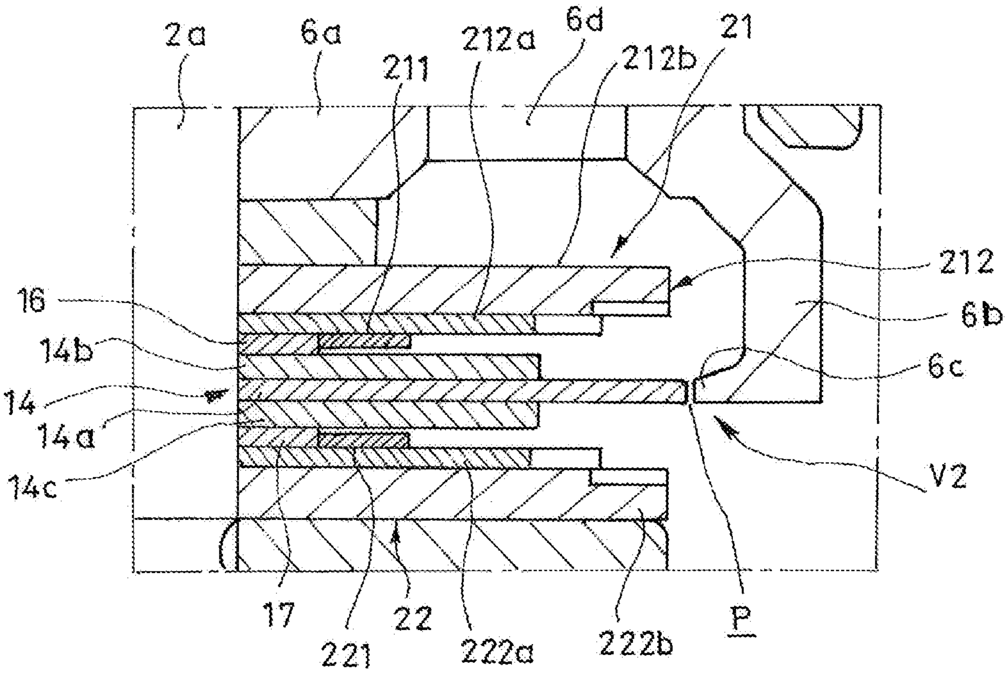
FIG. 6 is a cross-sectional view of the valve according to a second modification of the one embodiment of the present invention.

Alternatively, the annular valve body 14 may be configured by stacking a plurality of leaf valves 14*a*, 14*b*, and 14*c* as in a valve V2 of a second modification of the one embodiment illustrated in FIG. 6. Among the leaf valves 14*a*, 14*b*, and 14*c* constituting the annular valve body 14, the outer diameter of the central leaf valve 14*a* is the largest, and the outer diameters of the leaf valves 14*b* and 14*c* arranged above and below the leaf valve 14*a* are equal to each other. As illustrated in FIG. 6, the tip of the leaf valve 14*b*, 14*c* in addition to the leaf valve 14*a* comes into contact with the valve stopper 21, 22, and thus the number of stacked annular plates of the stacked annular plate 212, 222 in the valve stopper 21, 22 is adjusted in consideration of this. Specifically, the valve stopper 21 (22) includes a ring 211 (221) that is arranged on the outer circumference of the spacer 16 (17) and has an outer diameter smaller than the outer diameter of the leaf valve 14*a* (14*c*), and two annular plates 212*a* and 212*b* (222*a* and 222*b*) that have different outer diameters and are stacked such that the outer diameter gradually increases stepwise toward the non-seat side. In the valve V2 configured as described above, when the annular valve body 14 bends, the annular valve body 14 can be supported at four support points, the outer circumference of the ring 211 (221), the portion of the annular plate 212*a* (222*a*) in contact with the leaf valve 14*a* (14*c*), the outer circumference of the annular plate 212*a* (222*a*), and the annular plate 212*b* (222*b*) in the valve stopper 21 (22) to prevent the annular valve body 14 from being undulated and deformed. As described above, when the annular valve body 14 includes the plurality of leaf valves 14*a*, 14*b*, and 14*c*, the valve stopper 21 (22) may adjust the number of stacked annular plates in the stacked annular plate 212, 222 and the like according to the outer diameters and the thicknesses of the leaf valves 14*a*, 14*b*, and 14*c* of the annular valve body 14 so that the annular valve body 14 can be supported at a plurality of support points from the inner circumference to the outer circumference of the annular valve body 14 when the annular valve body 14 arcuately bends.

Furthermore, in the valve V of the present embodiment, since the stacked annular plate 132 (152) includes at least three annular plates 132*a*, 132*b*, and 132*c* (152*a*, 152*b*, and 152*c*) and four or more support points are provided in addition to the ring 131 (151), which can eliminate a large interval between the support points, the annular valve body 14 can be uniformly supported from the inner circumference to the outer circumference to effectively prevent the annular valve body 14 from being undulated and deformed and to effectively improve the durability.

In addition, in the valve V of the present embodiment, the ring 131 (151) is fixed to the annular plate 132*a* (152*a*) of the stacked annular plate 132 (152) in contact with the spacer 16 (17). According to the valve V configured as described above, since the ring 131 (151) can be fixed to the annular plate 132*a* (152*a*) in advance before assembling, the assemblability of the valve V is improved, and furthermore, since the ring 131 (151) can be positioned as intended, the bent annular valve body 14 can be supported at an ideal position to effectively reduce the stress of the annular valve body 14.

In the valve V of the present embodiment, the ring 131 (151) is fixed to the annular plate 132*a* (152*a*), but instead, as in the valve V2 illustrated in FIG. 6, the ring 211 (221) may be fitted to the outer circumference of the spacer 16 (17) and positioned in the radial direction. According to the valve V configured as described above, since the ring 211 (221) is positioned by the spacer 16 (17), the processing of welding or bonding the ring 211 (221) to the annular plate 212*a* (222*a*) is unnecessary and thus the number of processing steps can be reduced, and there is no concern that the support position of the annular valve body 14 changes due to falling of the ring 211 (221) from the annular plate 212*a* (222*a*).

In addition, the shock absorber D of the present embodiment includes the shock absorber main body A that has a cylinder (outer tube) 1 and the rod 2 movably inserted into the cylinder (outer tube) 1 and is extendable and contractible, the damping passage DP that communicates between two operating chambers (the extension side chamber R1 and the compression side chamber R2) provided in the shock absorber main body A, and the valve V provided in the damping passage DP. According to the shock absorber D configured as described above, since the valve V is inexpensive and has improved assemblability, the shock absorber itself is also inexpensive and excellent in assemblability.

Figure 7:
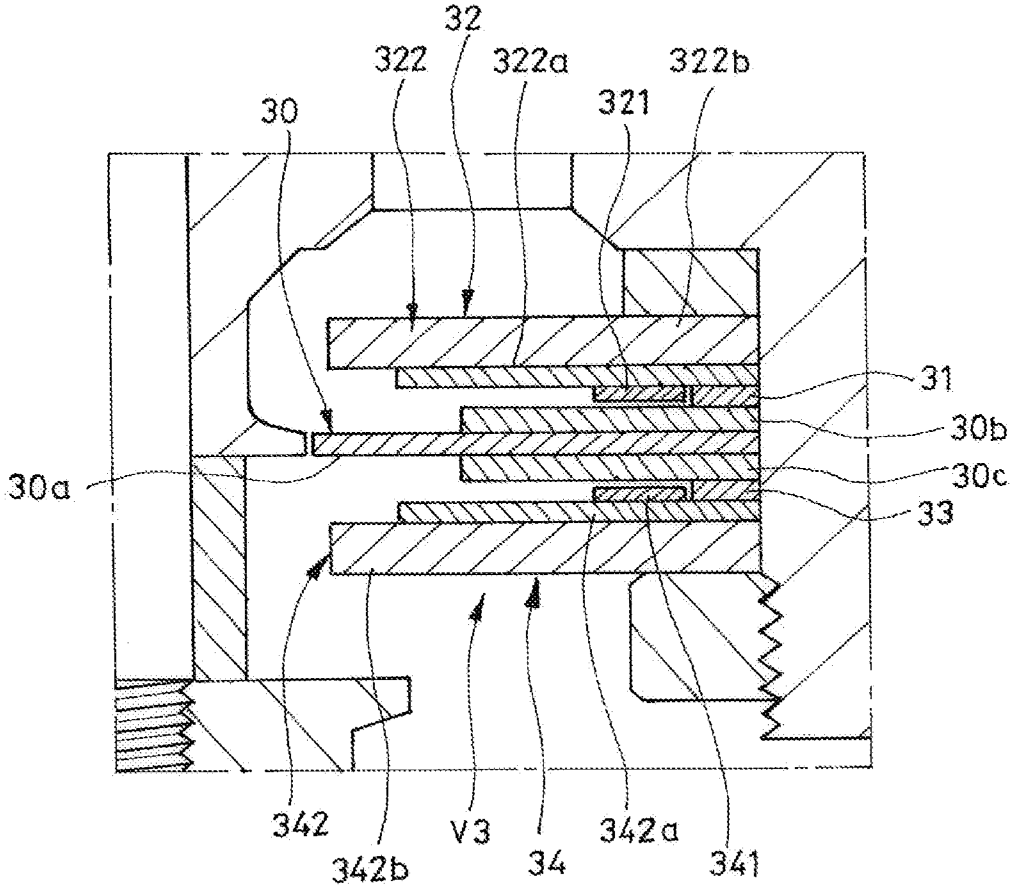
FIG. 7 is a cross-sectional view of the valve according to a third modification of the one embodiment of the present invention.

In the valve V of the present embodiment, the annular valve body 14 has a structure in which the annular valve body 14 is fixed to the inner circumference and is allowed to bend on the outer circumferential side, and faces the annular facing portion 6*c* on the outer circumference, but a structure like a valve V3 illustrated in FIG. 7 may be adopted. As illustrated in FIG. 7, the valve V3 of a third modification of the one embodiment may include: an annular valve body 30 having three leaf valves 30*a*, 30*b*, and 30*c* with difference inner diameters that have elasticity and are allowed to bend on the inner circumference serving as the free end; a spacer 31, 33 that is annular, has an inner diameter larger than the inner diameter of the annular valve body 30, is stacked on the annular valve body 30, and serves as a fulcrum of the bending of the free end of the annular valve body 30; and a valve stopper 32, 34 that faces the annular valve body 30 in the axial direction on the spacer side of the annular valve body 30 and regulates the bending of the annular valve body 30 when the annular valve body 30 bends and comes into contact therewith, wherein the valve stopper 32 (34) includes: a ring 321 (341) that is annular, has a thickness in the axial direction smaller than the thickness of the spacer 31 (33), and is arranged on the inner circumference of the spacer31 (33); and a stacked annular plate 322 (342) having a plurality of annular plates 322*a*, 322*b* (342*a*, 342*b*) that are annular and have an inner diameter smaller than the inner diameter of the ring 321 (341), have different inner diameters, and are stacked on the spacer 31 (33) such that the inner diameter gradually decreases stepwise toward the non-spacer side.

The stacked annular plate 322 (342) includes two annular plates 322*a* and 322*b* (342*a* and 342*b*) having different inner diameters, and is configured by stacking the annular plates 322*a* and 322*b* (342*a* and 342*b*) on the spacer 31 in descending order of inner diameters. In addition, the ring 321 (341) has a thickness smaller than the thickness of the spacer 31 (33), is fitted to the inner circumference of the spacer 31 (33), and has an inner diameter larger than the inner diameter of the annular plate 322*a* (342*a*) having the largest inner diameter.

Also with such a configuration, even when the inner circumferential side, which is the free end of the annular valve body 30, bends at the inner circumferential edge of the spacer 31 (33) serving as a fulcrum, the inner circumference of the ring 321 (341) and the inner circumference of each of the annular plates 322*a* and 322*b* (342*a* and 342*b*) of the stacked annular plate 322 (342) serve as support points and can support the annular valve body 30 in an arcuate bent state without undulating and deforming the bent annular valve body 30. Therefore, according to the valve V3 configured as described above, as in the valve V, since it is possible to prevent the annular valve body 30 from being undulated and deformed and it is not necessary to use a special ultra-thin spacer, the work load of an operator when assembling the valve V3 can be reduced, and the inexpensive spacer 31 can be used, which makes the valve V3 inexpensive and the assemblability of the valve V excellent. In addition, since the undulation and deformation of the annular valve body 30 in the valve V3 is prevented, the durability of the annular valve body 30 can be improved.

In addition, as illustrated in FIG. 1, the two operating chambers are defined as the extension side chamber R1 and the compression side chamber R2, but in the case of a twin tube shock absorber, although not illustrated, it is possible to use the compression side chamber and the reservoir as operating chambers, provide a damping passage communicating between the compression side chamber and the reservoir in a partition member partitioning the compression side chamber and the reservoir, and provide the valve V in the damping passage.

Furthermore, the valve V of the present embodiment is provided in the damping passage DP of the shock absorber D in series with the leaf valves 4 and 7, but may be provided in parallel or may be provided alone. In addition, since the valve V of the present embodiment is applicable to valves including annular valve bodies and valve stoppers that regulate bending of the annular valve bodies, it is obvious that the valve V of the present embodiment is also applicable to, for example, valves such as a check valve or a relief valve using the annular valve body in addition to the damping valve.

Figure 8:
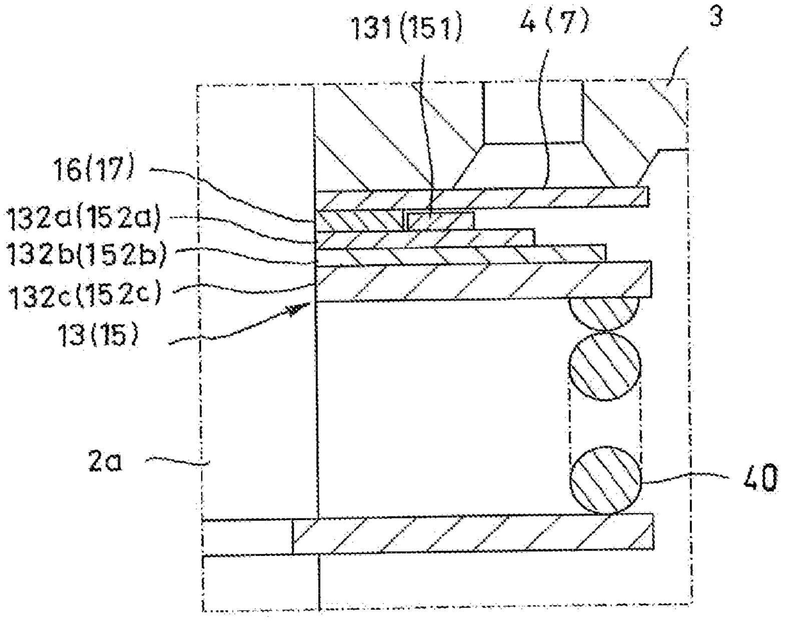
FIG. 8 is a cross-sectional view of a valve according to the another embodiment of the present invention.
Figure 9:
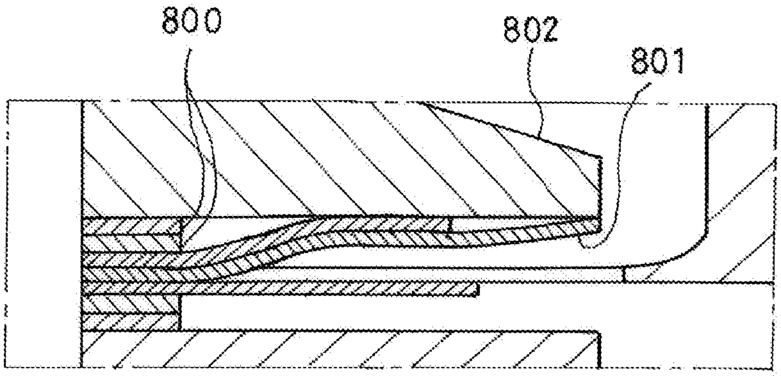
FIG. 9 is an enlarged cross-sectional view of a valve in the prior art.

In addition, as in another valve illustrated in FIG. 8, the leaf valve 4 (7), the spacer 16 (17), and the valve stopper 13 (15) may be placed in the outer circumference of the small-diameter portion 2*a* of the rod 2 so as to be movable in the axial direction, and may be stacked so as to be movable to or from the piston 3 in the axial direction, and a spring 40 for energizing the leaf valve 4 (7), the spacer 16 (17), and the valve stopper 13 (15) toward the piston 3 may be provided on the non-leaf-valve side of the valve stopper 13 (15). As described above, in the other valve, even when a very high pressure acts on the leaf valve 4 (7) from the front, and the spring 40 contracts and then the leaf valve 4 (7), the spacer 16 (17), and the valve stopper 13 (15) entirely lift from the piston 3, the valve stopper 13 (15) prevents the leaf valve 4 (7) from being undulated and deformed, and thus the durability of the leaf valve 4 (7) can be improved. Therefore, when the outer circumference serves as the free end, the inner circumference of the annular valve body may not be immovably fixed by another member such as the rod 2 as long as the outer circumference that is the free end is allowed to bend, and when the inner circumference serves as the free end, the outer circumference may not be immovably fixed by another member as long as the inner circumference that is the free end is allowed to bend.

The preferred embodiments of the present invention have been described in detail above, but modifications, variations, and alterations can be made without departing from the scope of the claims.

REFERENCE SIGNS LIST

1 Cylinder (outer tube)
2 Rod
6*c* Annular facing portion
13, 15, 21, 22, 32, 34 Valve stopper
14, 30 Annular valve body
16, 17, 31, 33 Spacer
131, 151, 211, 221, 321 Ring
132, 152, 212, 222, 322 Stacked annular plate
132*a*, 132*b*, 132*c*, 152*a*, 152*b*, 152*c*, 212*a*, 212*b*, 222*a*, 222*b*,
322*a*, 322*b*, 342*a*, 342*b* Annular plate
A Shock absorber main body
D Shock absorber
DP Damping passage
R1 Extension side chamber (operating chamber)
R2 Compression side chamber (operating chamber)
V, V1, V2, V3 Valve

The invention claimed is:

1. A valve comprising:

an annular valve body that has elasticity and is allowed to bend on an outer circumference serving as a free end;

a spacer that is annular, has an outer diameter smaller than an outer diameter of the annular valve body, is stacked on the annular valve body, and serves as a fulcrum of bending of the free end of the annular valve body; and a valve stopper that faces the annular valve body in an axial direction on a spacer side of the annular valve body and regulates bending of the annular valve body when the annular valve body bends and comes into contact therewith, wherein the valve stopper includes:

a ring that is annular, has a thickness in the axial direction smaller than a thickness of the spacer, and is arranged on an outer circumference of the spacer;

a stacked annular plate that is annular, has an outer diameter larger than an outer diameter of the ring, and is stacked on the spacer;

the outer diameter of the ring is smaller than the outer diameter of the annular valve body; and the annular valve body is supported by at least an outer circumferential edge of the ring and an outer circumferential edge of the stacked annular plate in a state where the annular valve body is bent and in contact with the valve stopper.

2. A valve comprising:

an annular valve body that has elasticity and is allowed to bend on an inner circumference serving as a free end;

a spacer that is annular, has an inner diameter larger than an inner diameter of the annular valve body, is stacked on the annular valve body, and serves as a fulcrum of bending of the free end of the annular valve body; and a valve stopper that faces the annular valve body in an axial direction on a spacer side of the annular valve body and regulates bending of the annular valve body when the annular valve body bends and comes into contact therewith, wherein the valve stopper includes:

a ring that is annular, has a thickness in the axial direction smaller than a thickness of the spacer, and is arranged on an inner circumference of the spacer;

a stacked annular plate that is annular, has an inner diameter smaller than an inner diameter of the ring, and is stacked on the spacer;

the inner diameter of the ring is larger than the inner diameter of the annular valve body; and the annular valve body is supported by at least an inner circumferential edge of the ring and an inner circumferential edge of the stacked annular plate in a state where the annular valve body is bent and in contact with the valve stopper.

3. The valve according to claim 1, wherein the stacked annular plate includes a plurality of annular plates that have different outer diameters and are stacked such that the outer diameter gradually increases stepwise toward a non-spacer side.

4. The valve according to claim 3, wherein the ring is fixed to the annular plate of the stacked annular plate in contact with the spacer.

5. The valve according to claim 1, wherein the ring is fitted to the outer circumference of the spacer and positioned in a radial direction.

6. The valve according to claim 1, comprising:

an annular facing portion that is annular and faces a free end of the annular valve body with an annular gap therebetween, wherein the spacer and the valve stopper are provided on one side of the annular valve body in the axial direction, and a second spacer and a second valve stopper are provided on an other side of the annular valve body in the axial direction.

7. A shock absorber comprising:

a shock absorber main body that includes an outer tube and a rod movably inserted into the outer tube and is extendable and contractible;

a damping passage that communicates between two operating chambers provided in the shock absorber main body; and the valve according to claim 1 provided in the damping passage.

8. The valve according to claim 2, wherein the stacked annular plate includes a plurality of annular plates that have different inner diameters and are stacked such that the inner diameter gradually decreases stepwise toward a non-spacer side.

9. The valve according to claim 8, wherein the ring is fixed to the annular plate of the stacked annular plate in contact with the spacer.

10. The valve according to claim 2, wherein the ring is fitted to the inner circumference of the spacer and positioned in a radial direction.

11. The valve according to claim 2, comprising:

an annular facing portion that is annular and faces a free end of the annular valve body with an annular gap therebetween, wherein the spacer and the valve stopper are provided on one side of the annular valve body in the axial direction, and a second spacer and a second valve stopper are provided on an other side of the annular valve body in the axial direction.

12. A shock absorber comprising:

a shock absorber main body that includes an outer tube and a rod movably inserted into the outer tube and is extendable and contractible;

a damping passage that communicates between two operating chambers provided in the shock absorber main body; and the valve according to claim 2 provided in the damping passage.

13. The valve according to claim 1, wherein the outer diameter of the stacked annular plate is smaller than the outer diameter of the annular valve body.

14. The valve according to claim 2, wherein the inner diameter of the stacked annular plate is larger than the inner diameter of the annular valve body.

* * * * *